United States Patent
Chilwarwar et al.

(10) Patent No.: US 11,629,070 B2
(45) Date of Patent: Apr. 18, 2023

(54) HYDROPHILICITY-BASED WATER PURIFICATION SYSTEMS

(71) Applicants: Kaustubh Chilwarwar, Boise, ID (US); Michael Hall, Vancouver, WA (US)

(72) Inventors: Kaustubh Chilwarwar, Boise, ID (US); Michael Hall, Vancouver, WA (US)

( * ) Notice: Subject to any disclaimer, the term of this patent is extended or adjusted under 35 U.S.C. 154(b) by 113 days.

(21) Appl. No.: 17/304,573

(22) Filed: Jun. 23, 2021

(65) Prior Publication Data
US 2022/0411291 A1 Dec. 29, 2022

(51) Int. Cl.
| | | |
|---|---|---|
| C02F 1/28 | (2023.01) | |
| C02F 1/00 | (2023.01) | |
| B01D 21/00 | (2006.01) | |
| B01D 21/02 | (2006.01) | |

(52) U.S. Cl.
CPC .......... *C02F 1/283* (2013.01); *B01D 21/0024* (2013.01); *B01D 21/0045* (2013.01); *B01D 21/10* (2013.01); *C02F 1/006* (2013.01); *C02F 1/008* (2013.01); *C02F 2209/40* (2013.01); *C02F 2301/022* (2013.01)

(58) Field of Classification Search
CPC .. B01D 21/004; B01D 21/0045; B01D 21/10; B01D 69/02; B01D 69/08; B01D 2323/02; B01D 67/0006; B01D 3/14; B01D 3/141; B01D 3/143; B01D 3/146; B01D 61/42; B01D 61/58; B01D 61/362; B01D 61/3621; B01D 2325/36; B01J 20/261; B32B 2307/728; C02F 1/006; C02F 1/008; C02F 1/283; C02F 2209/40; C02F 2301/022; C02F 1/001; C02F 9/00; C02F 2301/08; C02F 2201/002; B01L 3/502715; B01L 2300/087; B01L 2300/0864; B01L 2300/0681
See application file for complete search history.

(56) References Cited

U.S. PATENT DOCUMENTS

| | | | |
|---|---|---|---|
| 7,793,788 | B2 | 9/2010 | Pollack |
| 9,504,937 | B2 | 11/2016 | Pollack |
| 9,914,074 | B2 | 3/2018 | Pollack |
| 2002/0130071 | A1 | 9/2002 | Manz et al. |
| 2006/0108286 | A1 | 5/2006 | Hambitzer et al. |

(Continued)

*Primary Examiner* — Magali P Slawski
*Assistant Examiner* — Bernadette Karen McGann (57) ABSTRACT

Water purification systems including an inlet chamber, a purification module, a purified water outlet, and an impure water outlet. The inlet chamber is configured to receive an input water stream. The purification module includes a purification chamber configured to divide the input water stream into a purified water stream fluidly coupled to the purified water outlet and an impure water stream fluidly coupled to the impure water outlet. The purification chamber includes a first hydrophilic surface and a second hydrophilic surface spaced from the first hydrophilic surface. The first hydrophilic surface and the second hydrophilic surface cooperate to establish purified zones of substantially pure water and an impure zone of impurity concentrated water from the input water stream. The purified water stream is supplied by substantially pure water from the purified zones and the impure water stream is supplied by the impurity concentrated water from the impure zone.

20 Claims, 8 Drawing Sheets

(56) References Cited

U.S. PATENT DOCUMENTS

| | | | |
|---|---|---|---|
| 2015/0166364 A1* | 6/2015 | Wiegele | C02F 1/002 |
| | | | 210/660 |
| 2017/0050122 A1* | 2/2017 | Pollack | C02F 1/28 |
| 2017/0113950 A1 | 4/2017 | Bahar et al. | |
| 2018/0079662 A1 | 3/2018 | Bower et al. | |

* cited by examiner

HYDROPHILICITY-BASED WATER PURIFICATION SYSTEMS

BACKGROUND

The present disclosure relates generally to water purification systems. In particular, hydrophilicity-based water purification systems are described.

Cleaning water to make it potable is important for human and animal health. Manufacturing, farming, tourism, recreation, energy production, and other economic sectors require clean water to function effectively and efficiently.

Cleaning water to make it potable is technologically challenging. Currently, there are two major technologies to purify water: reverse osmosis (RO) and distillation. Both these technologies suffer from numerous drawbacks. An important drawback of each of these technologies is that they consume large amounts of energy.

For instance, saltwater reverse osmosis—converting saltwater into freshwater, also known as desalination—consumes an average of 10-13 kilowatt hours (kwh) per every thousand gallons. Theoretically, distillation requires a minimum energy of 2594 kJ for cleaning 1 liter of water, which is roughly 2700 kwh per 1000 gallons. Thus, both technologies are highly energy intensive. In addition, these technologies are not readily scalable.

Increasing population increases the demand for potable water, both for individual use and for various industrial and commercial uses, such as foods, drinks, and alcohol. The increasing demand for potable water increases the amount of energy needed to purify water. Energy sources to meet the energy demands to purify water, such as electricity and fuels, have huge environmental impacts. At times, the energy demands can not be met and droughts occur.

In summary, conventional water purification systems are not entirely satisfactory for a variety of reasons. One, existing water purification systems are energy intensive and expensive to operate. Two, conventional water purification systems are complicated and difficult to scale. Third, maintenance and operating procedures are also undesirably involved with currently known water purification systems.

It would be desirable to have a water purification system that did not require power to operate. It would be further desirable to have a water purification system that did not rely on fossil fuels and that did not contribute to greenhouse gas emissions. It would be beneficial to have a water purification system that was simple to operate with no moving parts. It would also be beneficial to have a water purification system that was easy to maintain, operate, and scale.

Thus, there exists a need for water purification systems that improve upon and advance the design of known water purification systems. Examples of new and useful water purification systems relevant to the needs existing in the field are discussed below.

SUMMARY

The present disclosure is directed to water purification systems including an inlet chamber, a purification module, a purified water outlet, and an impure water outlet. The inlet chamber is configured to receive an input water stream. The purification module includes a purification chamber configured to divide the input water stream into a purified water stream fluidly coupled to the purified water outlet and an impure water stream fluidly coupled to the impure water outlet. The purification chamber includes a first hydrophilic surface and a second hydrophilic surface spaced from the first hydrophilic surface. The first hydrophilic surface and the second hydrophilic surface cooperate to establish purified zones of substantially pure water and an impure zone of impurity concentrated water from the input water stream. The purified water stream is supplied by substantially pure water from the purified zones and the impure water stream is supplied by the impurity concentrated water from the impure zone.

DETAILED DESCRIPTION

The disclosed water purification systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various water purification systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device exchanges information with another electronic device, either wirelessly or with a wire-based connector, whether directly or indirectly through a communication network.

"Controllably coupled" means that an electronic device controls operation of another electronic device.

Hydrophilicity-Based Water Purification Systems

With reference to the figures, hydrophilicity-based water purification systems will now be described. The water purification systems discussed herein function to purify a stream of water.

The reader will appreciate from the figures and description below that the presently disclosed water purification systems address many of the shortcomings of conventional water purification systems. For example, the water purification systems described herein do not require power to operate. Further, the water purification systems described in this document do not rely on fossil fuels and do not contribute to greenhouse gas emissions. The systems described below have no moving parts and are easy to maintain, operate, and scale.

Water Purification System Embodiment One

With reference to FIGS. 1-8, a water purification system 100 will now be described as a first example of a water purification system. As shown in FIGS. 1-8, water purification system 100 includes an inlet chamber 101, a purification module 102, a purified water outlet 106, an impure water outlet 107. In other examples, the water purification system includes fewer components than depicted in the figures. In certain examples, the water purification system includes additional or alternative components than depicted in the figures.

The size of the water purification system may be varied as needed for a given application. In some examples, the water purification system is larger than depicted in the figures. In other examples, the water purification system is smaller than depicted in the figures.

Inlet Chamber

As shown in FIGS. 1, 2, 5, and 7, inlet chamber 101 is configured to receive an input water stream 160. With reference to FIGS. 1, 2, 5, and 7, the reader can see that inlet chamber 101 includes a primary inlet 129 through which input water stream 160 enters inlet chamber 101.

Figure 1:
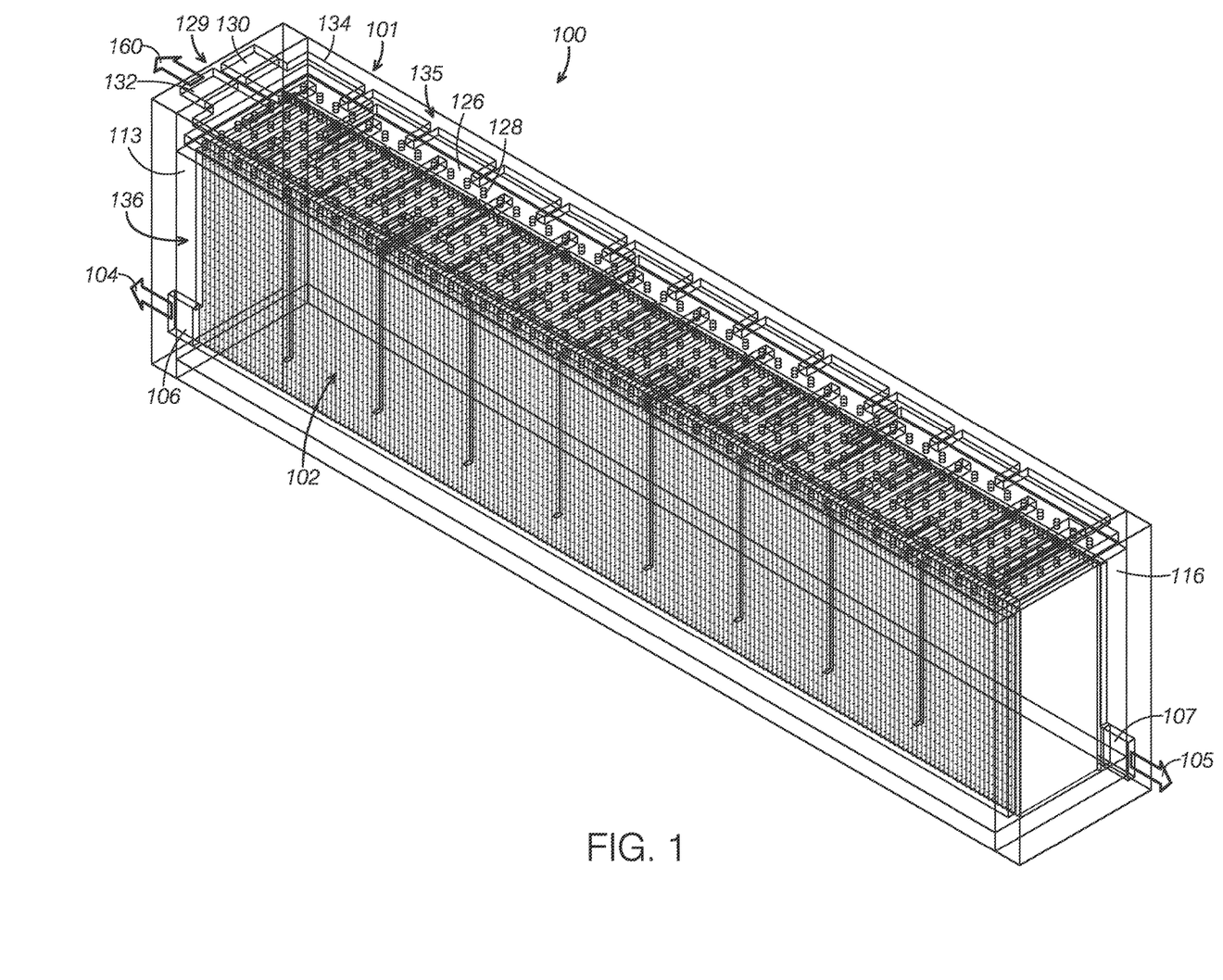
FIG. 1 is a perspective view of water purification system.
Figure 2:
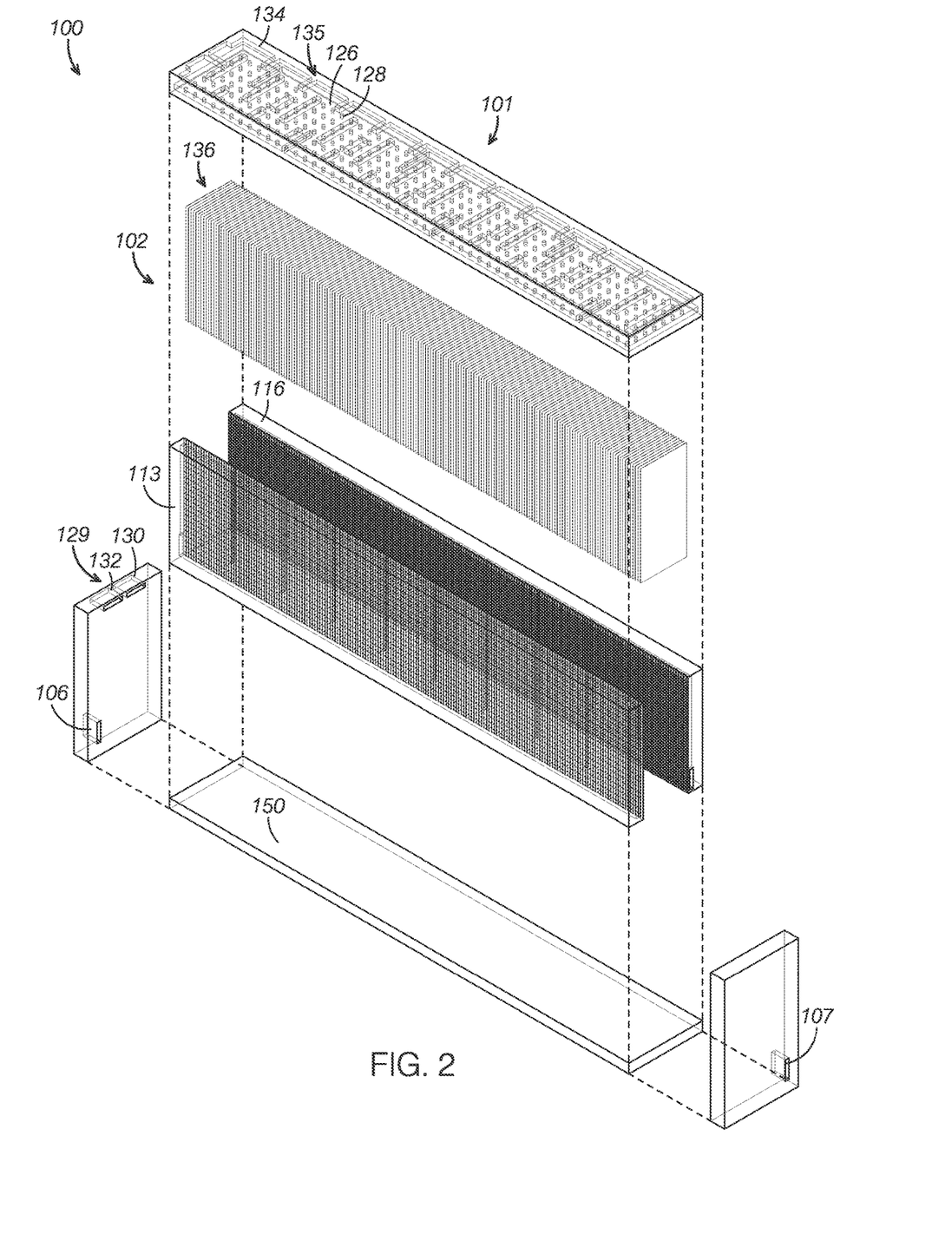
FIG. 2 is an exploded view of the water purification system shown in FIG. 1.
Figure 5:
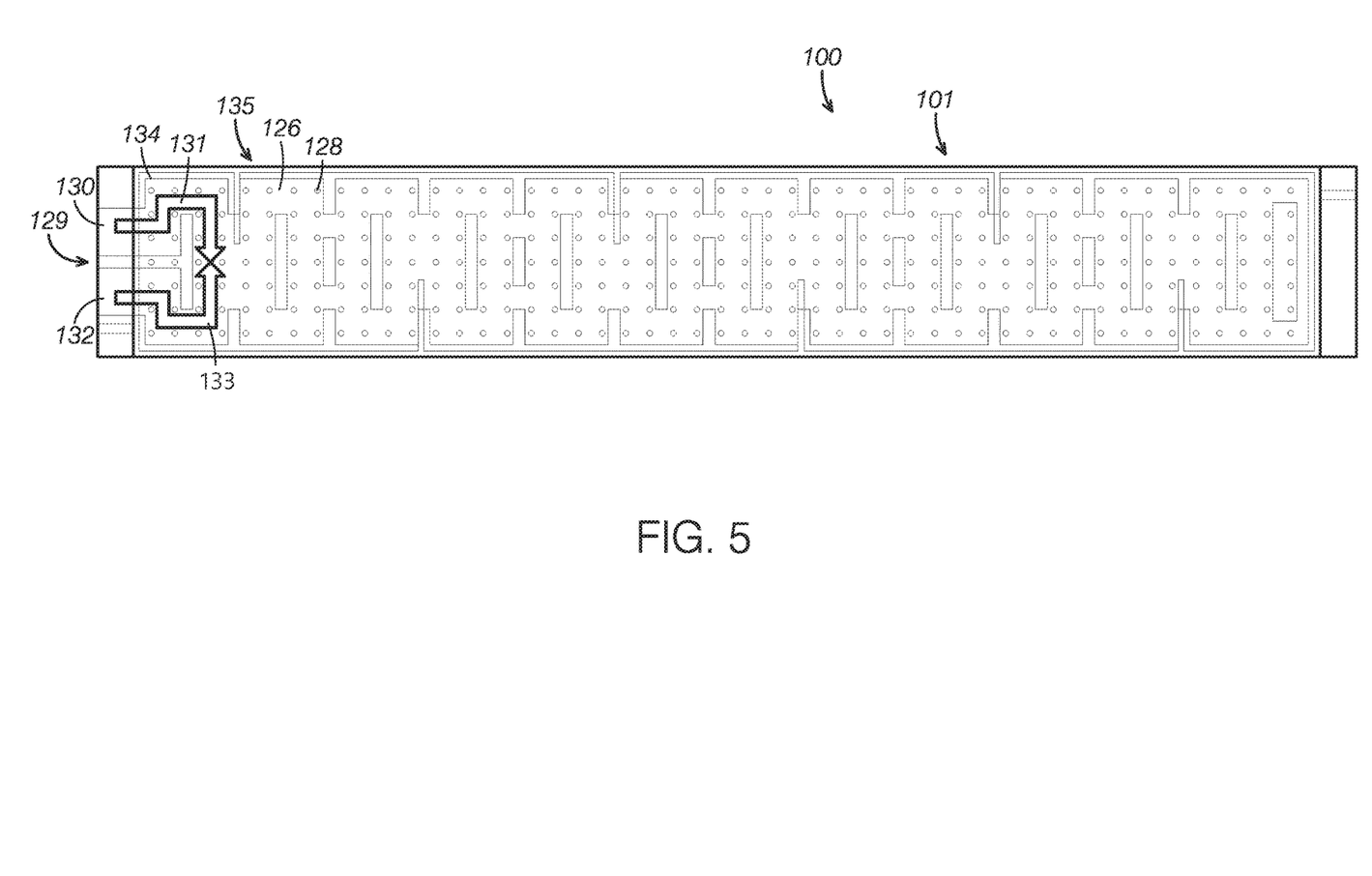
FIG. 5 is a top plan view of the inlet chamber showing internal flow control chambers and floor ports.
Figure 6:
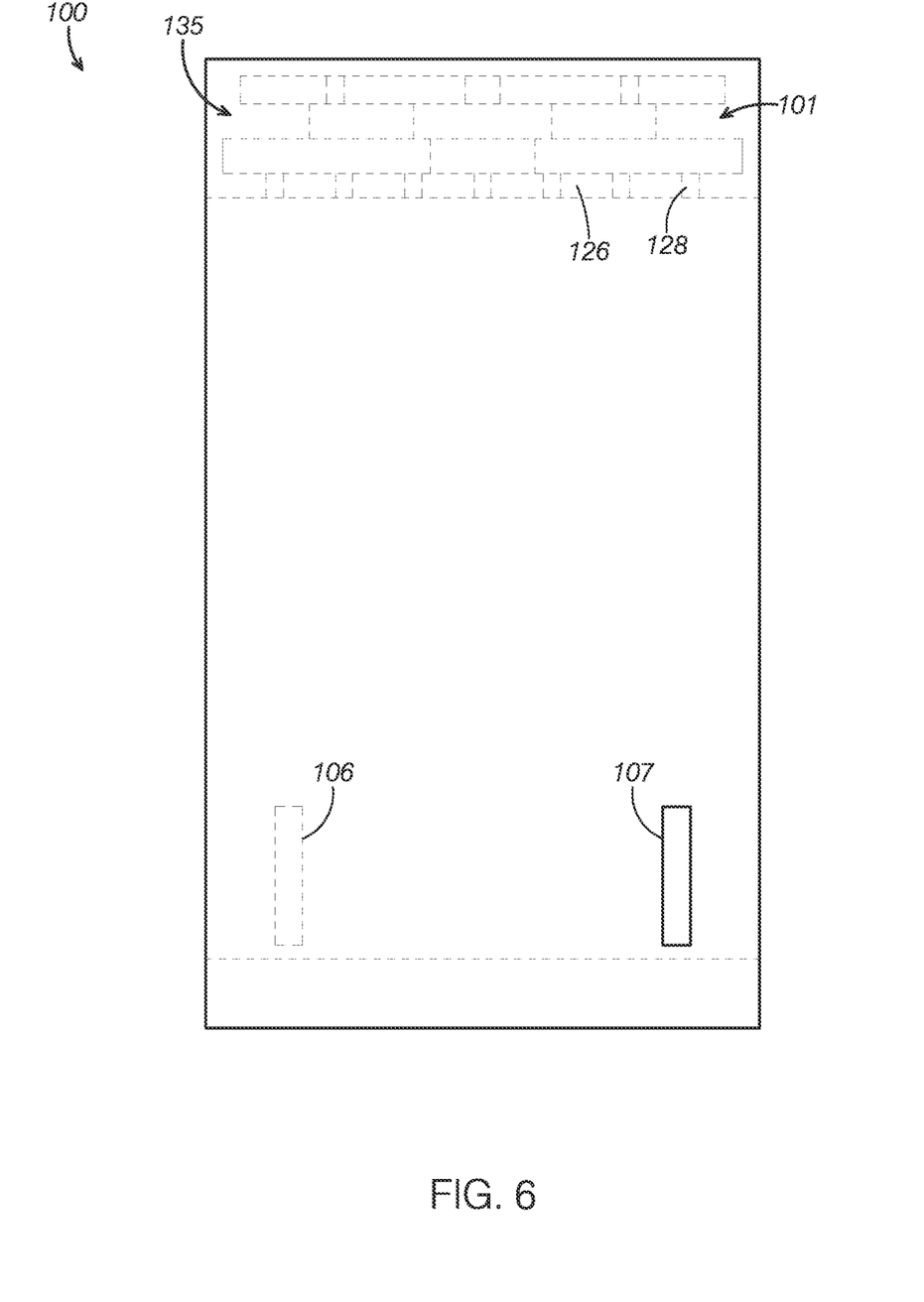
FIG. 6 is a front side elevation view of the water purification system shown in FIG. 1.
Figure 7:
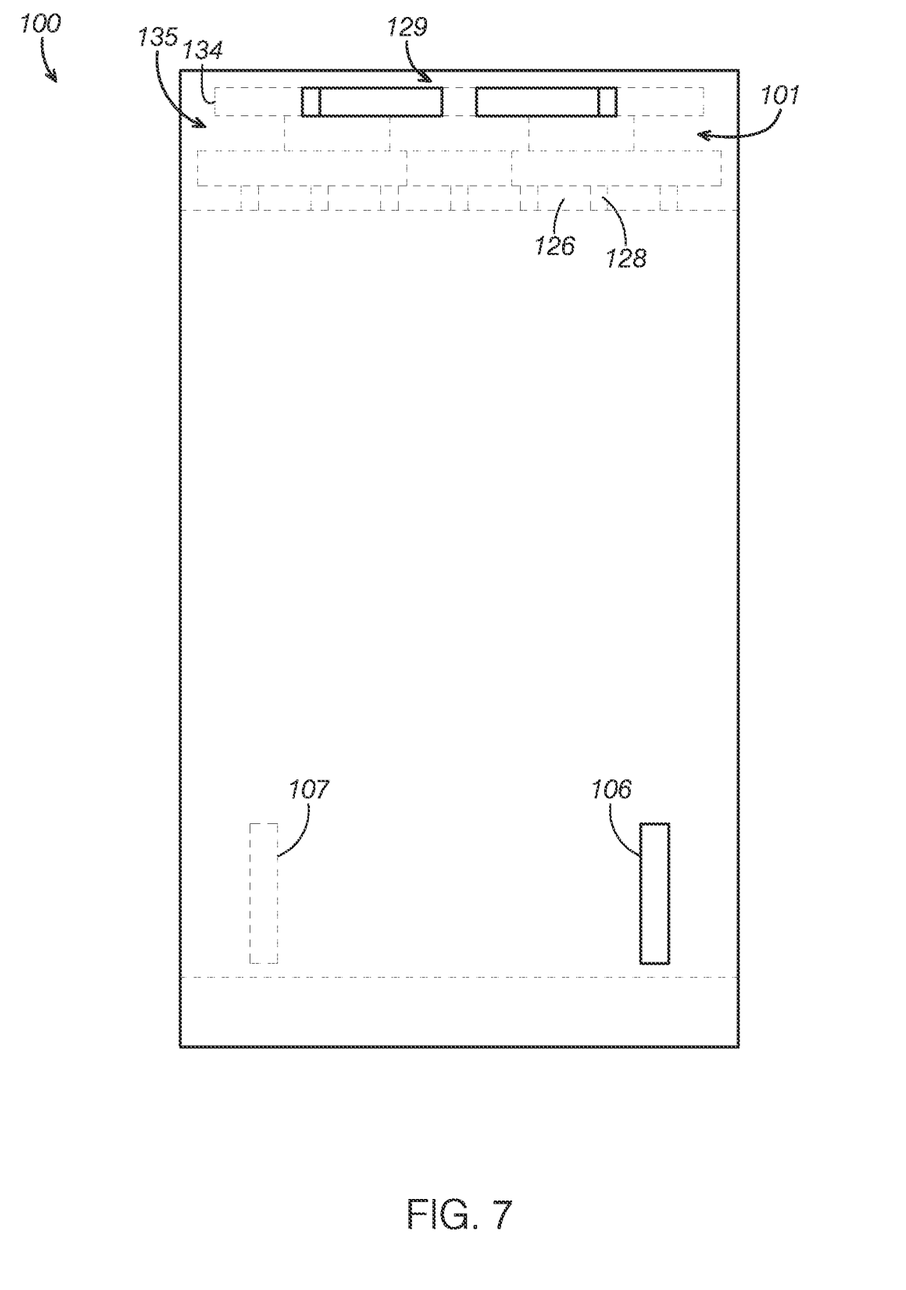
FIG. 7 is a rear side elevation view of the water purification system shown in FIG. 1.

Inlet chamber 101 is further configured to control the flow characteristics of input water stream 160. To that end, as shown in FIGS. 1, 2, and 5, inlet chamber 101 includes a plurality of flow control chambers 135 downstream of primary inlet 129. Plurality of flow control chambers 135 includes a flow control chamber 134, which is described in detail below.

As shown in FIGS. 1, 2, 5, and 7, inlet chamber 101 is also configured to deliver input water stream 160 to purification module 102. As depicted in FIGS. 1, 2, and 5-7, inlet chamber 101 includes a floor 126 proximate purification module 102 with a plurality of floor ports 128 providing a fluid communication path from inlet chamber 101 to purification module 102. In the particular example shown in FIGS. 1, 2, and 5-7, inlet chamber 101 is disposed above purification module 102.

The size of the inlet chamber may be varied as needed for a given application. In some examples, the inlet chamber is larger relative to the other components than depicted in the figures. In other examples, the inlet chamber is smaller relative to the other components than depicted in the figures. Further, the reader should understand that the inlet chamber and the other components may all be larger or smaller than described herein while maintaining their relative proportions.

Primary Inlet

The role of primary inlet 129 is to allow water to enter inlet chamber 101. The reader can see in FIGS. 1, 2, 5, and 7 that primary inlet 129 includes a first sub inlet 130 through which a first portion 131 of input water stream 160 enters inlet chamber 101. As shown in FIGS. 1, 2, 5, and 7, primary inlet 129 also includes a second sub inlet 132 through which a second portion 133 of input water stream 160 enters inlet chamber 101.

The shape of the primary inlet may be adapted to be different than the specific examples shown in the figures to suit a given application. For example, the primary inlet may include a face having the shape of a regular or irregular polygon, such as a circle, oval, triangle, square, rectangle pentagon, and the like. Additionally or alternatively, the primary inlet may include a face having an irregular shape. In three dimensions, the shape of the primary inlet may be a sphere, a pyramid, a cone, a cube, and variations thereof, such as a hemisphere or a frustoconical shape.

The size of the primary inlet may be varied as needed for a given application. In some examples, the primary inlet is larger relative to the other components than depicted in the figures. In other examples, the primary inlet is smaller relative to the other components than depicted in the figures. Further, the reader should understand that the primary inlet and the other components may all be larger or smaller than described herein while maintaining their relative proportions.

Flow Control Chambers

Flow control chamber 134 functions to control the flow characteristics of input water stream 160. In the example depicted in FIGS. 1, 2, and 5, the flow control chambers cause input water stream 160 to flow laminarly in inlet chamber 101. As shown in FIGS. 1, 2, and 5, flow control chamber 134 defines flow channels directing first portion 131 of input water stream 160 to collide head-on with second portion 133 of input water stream 160 to offset the flow energies of first portion 131 and second portion 133.

Floor

Floor 126 functions to help direct input water stream 160 through inlet chamber 101 and to fluidly couple inlet chamber 101 with purification module 102. With reference to FIGS. 1, 2, and 5-7, floor 126 defines plurality of floor ports 128 extending through floor 126. Plurality of floor ports 128 fluidly couple inlet chamber 101 with purification module 102, including with purification chamber 103.

The size of the floor may be varied as needed for a given application. In some examples, the floor is larger relative to the other components than depicted in the figures. In other examples, the floor is smaller relative to the other components than depicted in the figures. Further, the reader should understand that the floor and the other components may all be larger or smaller than described herein while maintaining their relative proportions.

Purification Module

Figure 3:
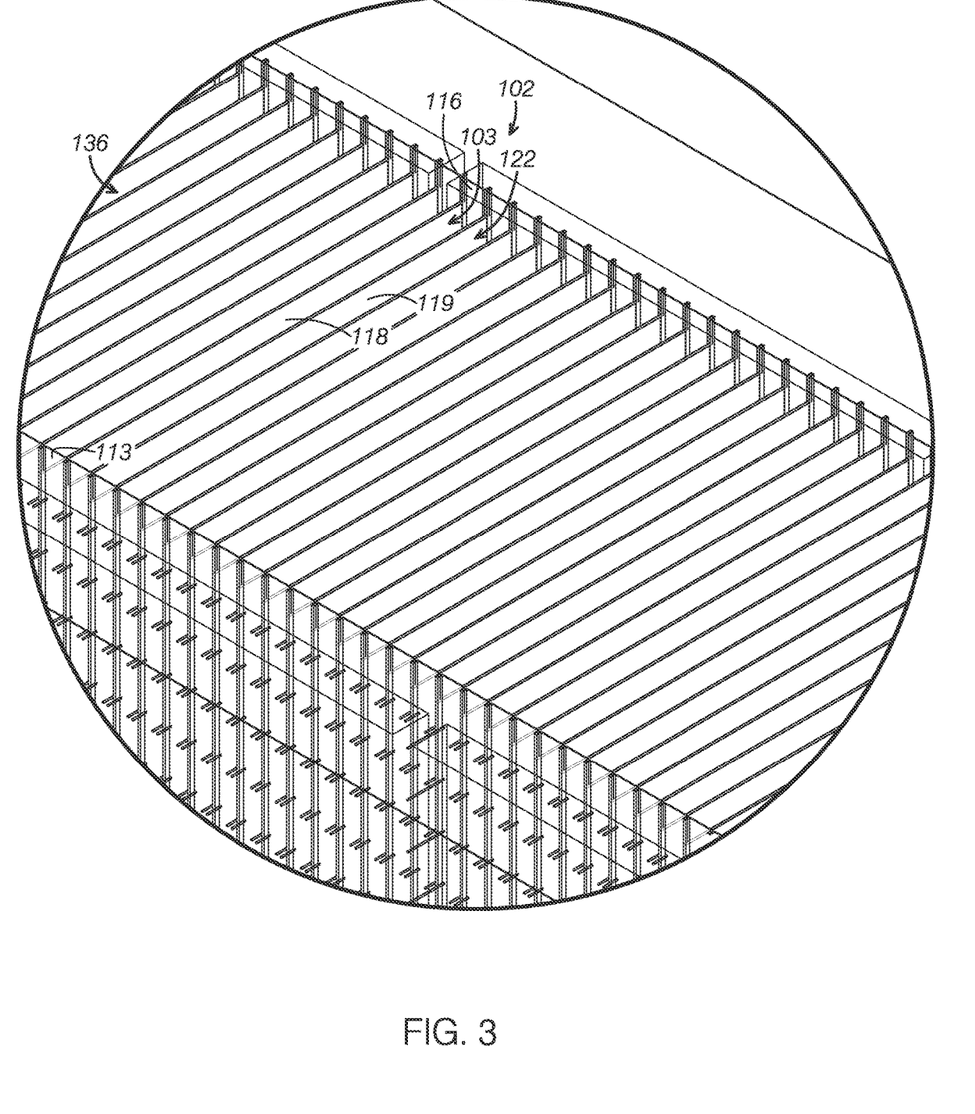
FIG. 3 is a top perspective view of the water purification system shown in FIG. 1 with an inlet chamber removed to depict a plurality of purification chambers.

Purification module 102 functions to divide input water stream 160 into a purified water stream 104 and an impure water stream 105. As shown in FIGS. 1-3, purification module 102 includes a plurality of purification chambers 136, including purification chamber 103 and adjacent purification chamber 122 depicted in FIG. 4.

Each purification chamber in plurality of purification chambers 136, including purification chamber 103 and adjacent purification chamber 122, is configured to divide a portion of input water stream 160 into purified water stream 104 and impure water stream 105. Each of the purification chambers in plurality of purification chambers 136 is substantially identical to purification chamber 103. Purification chamber 103 and adjacent purification chamber 122 are depicted in detail in FIG. 4 and described in more detail below.

The shape of the purification module may be adapted to be different than the specific examples shown in the figures to suit a given application. In three dimensions, the shape of the purification module may be a sphere, a pyramid, a cone, a cube, and variations thereof, such as a hemisphere or a frustoconical shape.

The size of the purification module may be varied as needed for a given application. In some examples, the purification module is larger relative to the other components than depicted in the figures. In other examples, the purification module is smaller relative to the other components than depicted in the figures. Further, the reader should understand that the purification module and the other components may all be larger or smaller than described herein while maintaining their relative proportions.

Purification Chambers

Purification chamber 103 and adjacent purification chamber 122 function to divide a portion of input water stream 160 into purified water stream 104 and impure water stream 105. Adjacent purification chamber 122 is adjacent to purification chamber 103 and is configured substantially the same as purification chamber 103. In the present example, adjacent purification chamber 122 shares a wall, second chamber wall 119, with purification chamber 103.

Figure 4:
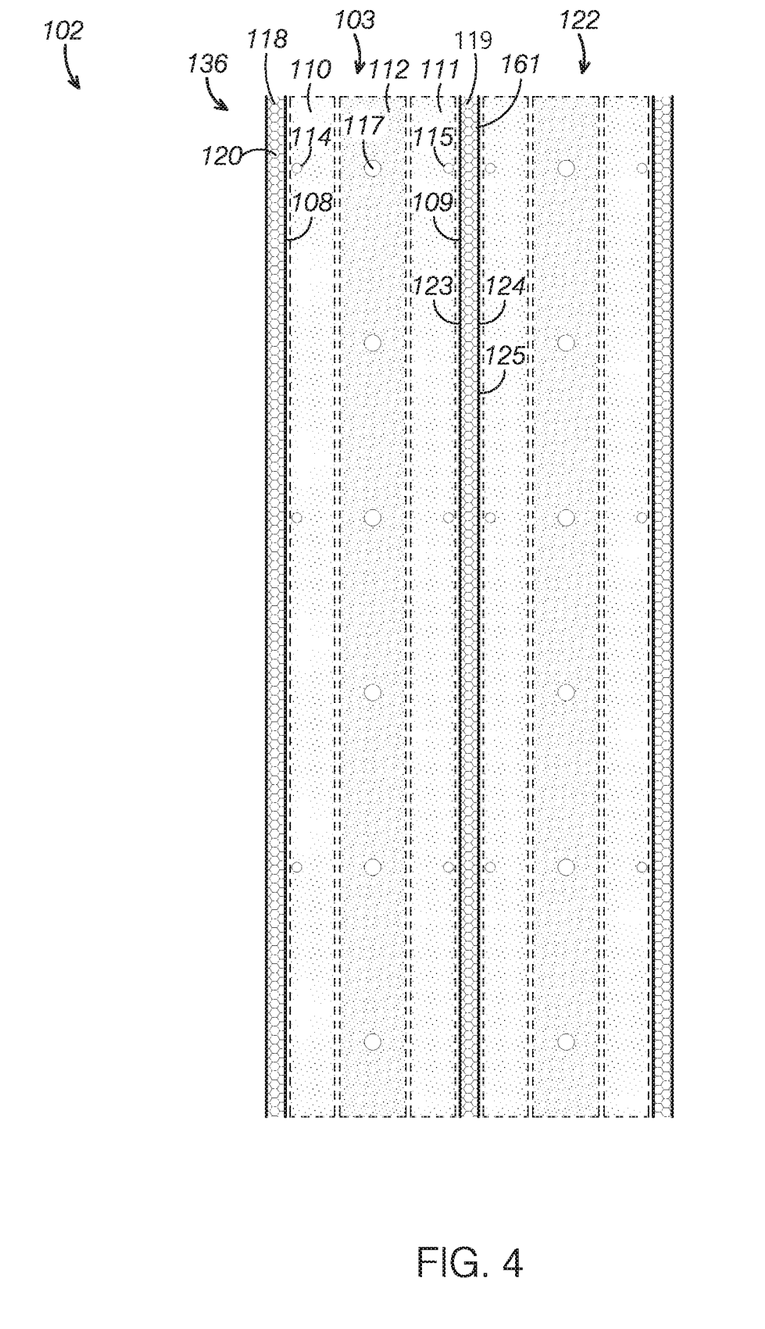
FIG. 4 is a right side elevation view of one of the purification chambers.

As depicted in FIGS. 3 and 4, purification chamber 103 includes a first chamber wall 118, a second chamber wall 119, a purified outlet wall 113, and an impure outlet wall 116 collectively defining the lateral boundaries of purification chamber 103. Longitudinal boundaries of purification chamber 103 are defined by floor 126 to the top of purification chamber 103 and a tray 150 disposed on the bottom of purification chamber 103.

Second chamber wall 119 is spaced from first chamber wall 118. As depicted in FIGS. 2 and 3, purified outlet wall 113 and impure outlet wall 116 extend between first chamber wall 118 and second chamber wall 119. As shown in FIGS. 3 and 4, impure outlet wall 116 is spaced from purified outlet wall 113. In FIG. 4, to more effectively depict the location of ports relative to the purified water zones and the impure water zone, purified outlet wall 113 is depicted transparently closest to the viewing plane of the page and impure outlet wall 116 is depicted transparently into the page beyond the viewing plane of the page.

Purification chamber 103 functions to establish distinct zones of water within purification chamber 103; namely, two purified zones and an impure water zone. As shown in FIG. 4, purification chamber 103 establishes a first purified zone 110 of substantially pure water proximate first chamber wall 118 and a second purified zone 111 of substantially pure water proximate second chamber wall 119. Between first purified zone 110 and second purified zone 111 is disposed an impure zone 112 of impurity concentrated water.

With reference to FIG. 4, purified water stream 104 is supplied by substantially pure water from first purified zone 110 and second purified zone 111. With continued reference to FIG. 4, impure water stream 105 is supplied by the impurity concentrated water from impure zone 112.

The number of purification chambers in the water purification system may be selected to meet the needs of a given application. The reader should appreciate that the number of purification chambers may be different in other examples than is shown in the figures. For instance, some water purification system examples include additional or fewer purification chambers than described in the present example.

The size of the purification chamber may be varied as needed for a given application. In some examples, the purification chamber is larger relative to the other components than depicted in the figures. In other examples, the purification chamber is smaller relative to the other components than depicted in the figures. Further, the reader should understand that the purification chamber and the other components may all be larger or smaller than described herein while maintaining their relative proportions.

Walls

The role of the chamber walls is to define lateral boundaries of the purification chambers and to present hydrophilic surfaces inside the chambers. The purified outlet wall and the impure outlet wall function to define lateral boundaries of the purification chambers and to define ports through which water processed by the purification chambers may reach the pure water outlet and the impure water outlet.

Figure 8:
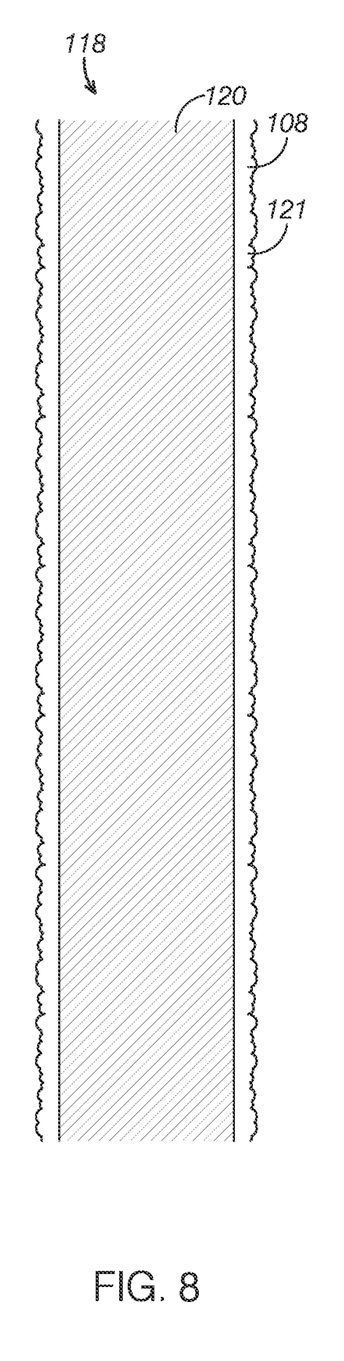
FIG. 8 is a simplified cross section view of a chamber wall depicting a substrate with left and right faces each having an activated carbon sphere coating.

As depicted in FIGS. 4 and 8, first chamber wall 118 includes a first substrate 120 and a first hydrophilic surface 108. The reader can see in FIG. 4 that second chamber wall 119 includes a second substrate 161 and second hydrophilic surface 109. As depicted in FIG. 4, second chamber wall 119 includes a first major face 123 and a second major face 124 on an opposite side of second substrate 161 than first major face 123.

As depicted in FIG. 4, purified outlet wall 113 defines a first port 114 and a second port 115. As shown in FIGS. 3 and 4, impure outlet wall 116 defines a third port 117.

The size of the walls may be varied as needed for a given application. In some examples, the walls are larger relative to the other components than depicted in the figures. In other examples, the walls are smaller relative to the other components than depicted in the figures. Further, the reader should understand that the walls and the other components may all be larger or smaller than described herein while maintaining their relative proportions.

Substrates

The role of the substrates is to provide structure for the chamber walls and a surface on which to establish the hydrophilic surfaces. In the example depicted in FIGS. 4 and 8 that first substrate 120 is comprised of glass. However, the substrates may be composed of any currently known or later developed material suitable for the applications described herein.

Hydrophilic Surfaces

The role of the hydrophilic surfaces is to draw substantially pure water towards them and to exclude impurities in the water away from them. The hydrophilic surfaces contribute to forming the first purified zone 110, the second purified zone 111, and the impure zone 112.

In particular, with reference to FIG. 4, first hydrophilic surface 108 establishes first purified zone 110 of substantially pure water from input water stream 160 proximate first hydrophilic surface 108. As shown in FIG. 4, second hydrophilic surface 109 establishes second purified zone 111 of substantially pure water from input water stream 160 proximate second hydrophilic surface 109. As can be further seen in FIG. 4, first hydrophilic surface 108 and second hydrophilic surface 109 cooperate to establish impure zone 112 between first purified zone 110 and second purified zone 111.

The reader can see in FIGS. 4 and 8 that first hydrophilic surface 108 is bonded to first substrate 120 of first chamber wall 118 and second hydrophilic surface 109 is bonded to second substrate 161 of second chamber wall 119. As a result, second hydrophilic surface 109 is spaced from first hydrophilic surface 108.

With reference to FIG. 4, second hydrophilic surface 109 is disposed on first major face 123 of second chamber wall 119. As shown in FIG. 4, third hydrophilic surface 125 is disposed on second major face 124 of second chamber wall 119. The reader can see in FIG. 4 that second major face 124 and third hydrophilic surface 125 face into adjacent purification chamber 122.

As depicted in FIGS. 4 and 8, first hydrophilic surface 108 is comprised of carbon spheres 121. In other examples, a layer of non-spherical carbon or a mix of spherical and non-spherical carbon is used.

In the present example, carbon spheres 121 are activated by a chemical process. In other examples, the carbon spheres are activated by a physical process in addition or alternatively to a chemical process. The particular chemical process used to activate carbon spheres 121 is ethyl acetate hydrolysis in an alkaline environment. However, any currently known or later developed chemical process suitable for activating the carbon spheres may be used.

In addition or alternatively to activated carbon spheres, the hydrophilic surfaces may be composed of any currently known or later developed material suitable for forming a hydrophilic surface. In some examples, such as described below with regard to a second embodiment of a water purification system, the hydrophilic surface is a glass surface that has been autoclaved to increase its hydrophilicity.

Ports

The ports in the purification module 102 serve to fluidly communicate purified and impure water from the purification chambers to purified water outlet 106 and impure water outlet 107, respectively. The combination of FIGS. 3 and 4 demonstrates that first port 114 extends through purified outlet wall 113 and is disposed proximate first hydrophilic surface 108. With further reference to FIGS. 3 and 4, second port 115 extends through purified outlet wall 113 and is disposed proximate second hydrophilic surface 109. The reader can see by referencing FIGS. 3 and 4 that third port 117 extends through impure outlet wall 116 distal first hydrophilic surface 108 and second hydrophilic surface 109.

With reference to FIG. 4, the reader can see that first port 114 is disposed in first purified zone 110 and second port 115 is disposed in second purified zone 111. As shown in FIG. 4, third port 117 is disposed in impure zone 112.

The number of ports in the water purification system may be selected to meet the needs of a given application. The reader should appreciate that the number of ports may be different in other examples than is shown in the figures. For instance, some water purification system examples include additional or fewer ports than described in the present example.

The size and shape of the ports may be varied as needed for a given application. In some examples, the ports are larger relative to the other components than depicted in the figures. In other examples, the ports are smaller relative to the other components than depicted in the figures. Further, the reader should understand that the ports and the other components may all be larger or smaller than described herein while maintaining their relative proportions.

Water Outlets

The water outlets functions to direct water processed by purification module 102 out of water purification system 100. The reader can see in FIGS. 1 and 2 that purified water outlet 106 is fluidly coupled to purified water stream 104 exiting purification module 102 through purified outlet wall 113. As depicted in FIGS. 1 and 2, impure water outlet 107 is fluidly coupled to impure water stream 105 exiting purification module 102 through impure outlet wall 116.

The number of water outlets in the water purification system may be selected to meet the needs of a given application. The reader should appreciate that the number of water outlets may be different in other examples than is shown in the figures. For instance, some water purification system examples include additional water outlets than described in the present example.

The size and shape of the water outlets may be varied as needed for a given application. In some examples, the water outlets are larger relative to the other components than depicted in the figures. In other examples, the water outlets are smaller relative to the other components than depicted in the figures. Further, the reader should understand that the water outlets and the other components may all be larger or smaller than described herein while maintaining their relative proportions.

Additional Embodiments

With reference to the figures not yet discussed in detail, the discussion will now focus on additional water purification system embodiments. The additional embodiments include many similar or identical features to water purification system 100. Thus, for the sake of brevity, each feature of the additional embodiments below will not be redundantly explained. Rather, key distinctions between the additional embodiments and water purification system 100 will be described in detail and the reader should reference the discussion above for features substantially similar between the different water purification system examples.

Water Purification System Embodiment Two

Figure 9:
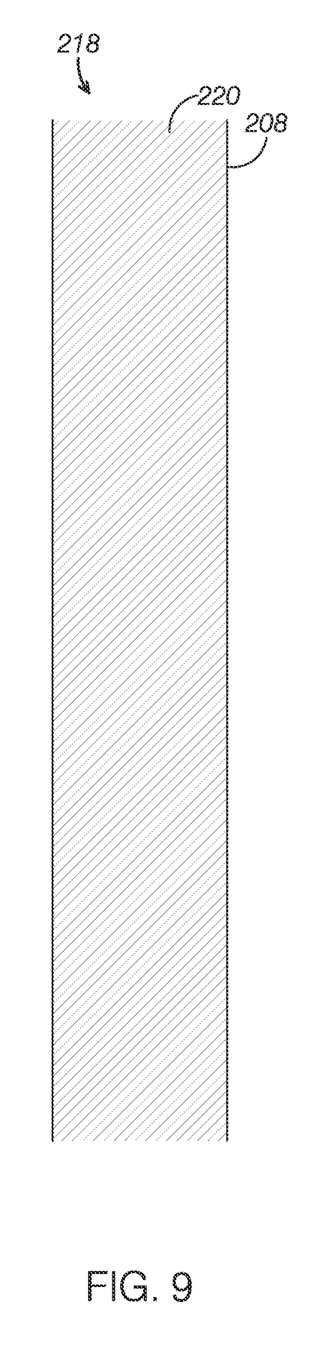
FIG. 9 is a simplified cross section view of a chamber wall depicting a substrate with left and right faces that have been autoclaved to make them hydrophilic.

Turning attention to FIG. 9, a chamber wall 218 will now be described as a second example of a chamber wall included in a second embodiment of a water purification system. As shown in FIG. 9, chamber wall 218 includes a substrate 220. In the example shown in FIG. 9, substrate 220 is glass.

In the example shown in FIG. 9, a hydrophilic surface 208 is formed on substrate 220 by autoclaving substrate 220. The autoclaving process makes the surface of substrate 220 significantly more hydrophilic than it would otherwise be. Hydrophilic surface 208 established by autoclaving substrate 220 differs from hydrophilic surface 108 of activated carbon spheres 121 on chamber wall 118.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A water purification system, comprising:
an inlet chamber configured to receive an input water stream;
a purification module fluidly coupled to the inlet chamber, the purification module including a purification chamber configured to divide the input water stream into a purified water stream and an impure water stream;
a purified water outlet fluidly coupled to the purified water stream; and
an impure water outlet fluidly coupled to the impure water stream;
wherein the purification chamber includes:
a first hydrophilic surface; and
a second hydrophilic surface spaced from the first hydrophilic surface;
wherein the first hydrophilic surface and the second hydrophilic surface cooperate to establish:
a first purified zone of substantially pure water from the input water stream proximate the first hydrophilic surface;
a second purified zone of substantially pure water from the input water stream proximate the second hydrophilic surface; and
an impure zone of impurity concentrated water from the input water stream disposed between the first purified zone and the second purified zone;
wherein the purified water stream is supplied by substantially pure water from the first purified zone and the second purified zone; and
wherein the impure water stream is supplied by the impurity concentrated water from the impure zone.

2. The water purification system of claim 1, wherein:
the purification chamber further includes:
a purified outlet wall extending between the first hydrophilic surface and the second hydrophilic surface; and
the purified outlet wall defines:
a first port extending through the purified outlet wall and disposed proximate the first hydrophilic surface; and
a second port extending through the purified outlet wall and disposed proximate the second hydrophilic surface.

3. The water purification system of claim 2, wherein:
the first port is disposed in the first purified zone; and
the second port is disposed in the second purified zone.

4. The water purification system of claim 3, wherein:
the purification chamber further includes an impure outlet wall extending between the first hydrophilic surface and the second hydrophilic surface and spaced from the purified outlet wall; and
the impure outlet wall defines a third port extending through the impure outlet wall distal the first hydrophilic surface and the second hydrophilic surface.

5. The water purification system of claim 4, wherein the third port is disposed in the impure zone.

6. The water purification system of claim 1, wherein:
the purification chamber includes:
a first chamber wall; and
a second chamber wall spaced from the first chamber wall;
the first chamber wall includes the first hydrophilic surface; and
the second chamber wall includes the second hydrophilic surface.

7. The water purification system of claim 6, wherein:
the first chamber wall includes a first substrate; and
the first hydrophilic surface is bonded to the first substrate.

8. The water purification system of claim 7, wherein:
the first substrate is comprised of glass; and
the first hydrophilic surface is comprised of carbon spheres.

9. The water purification system of claim 8, wherein the carbon spheres are activated.

10. The water purification system of claim 9, wherein the carbon spheres are activated by ethyl acetate hydrolysis in an alkaline environment.

11. The water purification system of claim 6, wherein:
the first chamber wall includes a first substrate; and
the first hydrophilic surface is formed by autoclaving the first substrate.

12. The water purification system of claim 6, wherein:
the water purification system includes an adjacent purification chamber adjacent to the purification chamber;
the adjacent purification chamber includes the second chamber wall;
the second chamber wall includes:
a first major face on which the second hydrophilic surface is disposed; and
a second major face opposite the first major face and on which a third hydrophilic surface is disposed; and
the second major face and the third hydrophilic surface face into the adjacent purification chamber.

13. The water purification system of claim 1, wherein:
the inlet chamber is disposed above the purification chamber;
the inlet chamber includes a floor proximate the purification chamber; and
the floor defines a floor port extending through the floor and fluidly coupling the inlet chamber with the purification chamber.

14. The water purification system of claim 13, wherein the floor defines a plurality of floor ports extending through the floor and fluidly coupling the inlet chamber with the purification chamber.

15. The water purification system of claim 1, wherein:
the inlet chamber includes a primary inlet through which the input water stream enters the inlet chamber;

the primary inlet includes a first sub inlet through which a first portion of the input water stream enters the inlet chamber; and the primary inlet includes a second sub inlet through which a second portion of the input water stream enters the inlet chamber.

16. The water purification system of claim 15, wherein:

the inlet chamber includes a flow control chamber; and the flow control chamber defines flow channels directing the first portion to collide head-on with the second portion to offset the flow energies of the first portion and the second portion.

17. The water purification system of claim 16, wherein:

the inlet chamber further comprises a plurality of flow control chambers; and the flow control chamber is one of the flow control chambers in the plurality of flow control chambers.

18. The water purification system of claim 17, wherein the flow control chambers cause the input water stream to flow laminarly in the inlet chamber.

19. The water purification system of claim 1, wherein:

the water purification system further comprises a plurality of purification chambers; and the purification chamber is one of the plurality of purification chambers.

20. The water purification system of claim 19, wherein each of the plurality of purification chambers is substantially identical to the purification chamber.

\* \* \* \* \*